(12) United States Patent
Nye

(10) Patent No.: US 7,547,180 B2
(45) Date of Patent: Jun. 16, 2009

(54) LOG SKIDDING IMPLEMENT FOR A THREE-POINT TRACTOR HITCH

(76) Inventor: Gary R. Nye, 489 Kennedy Valley Rd., Landisburg, PA (US) 17040

( * ) Notice: Subject to any disclaimer, the term of this patent is extended or adjusted under 35 U.S.C. 154(b) by 115 days.

(21) Appl. No.: 11/581,428

(22) Filed: Oct. 17, 2006

(65) Prior Publication Data

US 2008/0089771 A1 Apr. 17, 2008

(51) Int. Cl.
*B66D 3/00* (2006.01)
(52) U.S. Cl. .................. 414/703; 294/118; 414/734; 414/739
(58) Field of Classification Search .............. 414/703, 414/729, 734, 739, 920; 294/118, 81.61; 212/259, 260
See application file for complete search history.

(56) References Cited

U.S. PATENT DOCUMENTS

| 5,405,238 A * | 4/1995 | Samsel, Jr. .................. 414/703 |
| 6,921,241 B2 * | 7/2005 | Rogers ........................ 414/703 |

* cited by examiner

*Primary Examiner*—Donald Underwood
(74) *Attorney, Agent, or Firm*—Donald W. Meeker

(57) ABSTRACT

A log skidding implement consisting of a four foot horizontal boom and a set of modified skidding tongs hanging vertically from the end of the boom, attaches to the lift arms and top link of a three point tractor hitch. In-tractor controls lower the implement onto a log, causing the skidding tongs to pierce the log, which is then dragged to another location.

2 Claims, 2 Drawing Sheets

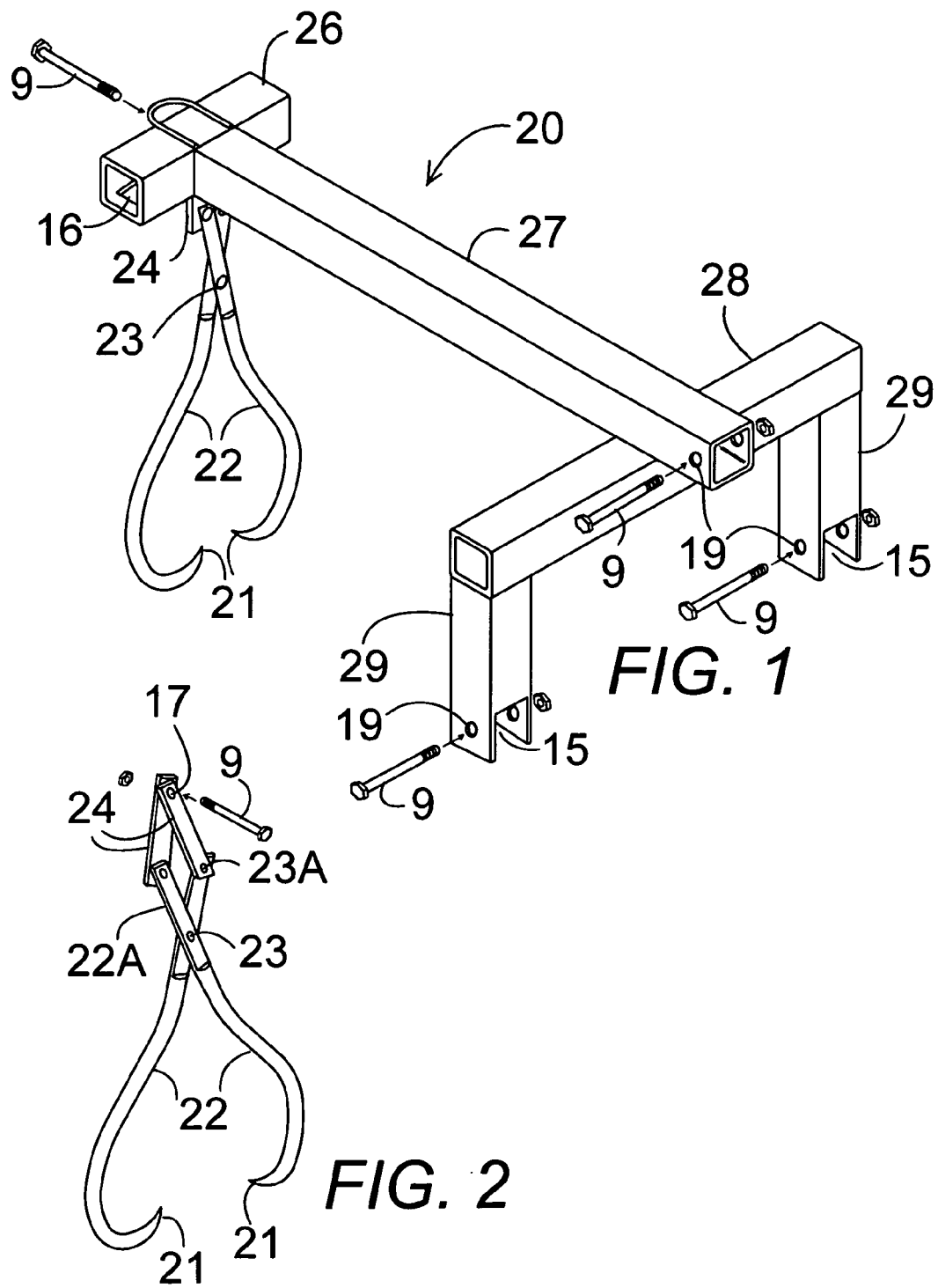

LOG SKIDDING IMPLEMENT FOR A THREE-POINT TRACTOR HITCH

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESERCH OR DEVELOPMENT

Not Applicable.

BACKGROUND OF THE INVENTION

1. Field of the Invention

The present invention relates to grabbing members attached to rear mounted draft members and particularly to a log skidding implement for a three-point tractor hitch which comprises a frame that attaches to the lift arms and top link of a tractor, a horizontal boom, and a set of modified log skidding tongs hanging vertically from the end of the boom.

2. Description of Related Art Including Information Disclosed Under 37 CFR 1.97 and 1.98

Logging operations require felling trees, cleaning the branches, and hauling the tree to a desired location for shipping the log. Typically prior art devices required a user to get down off the tractor to hook and unhook chains from around the log ends. This takes time and sometimes a good deal of effort depending on the size of the log. It is also dangerous in that a user might be injured by the log or the chains.

Tractors used for agricultural purposes generally have hydraulically operated facilities, among which is the three-point hitch. This hitch has three points of attachment for draft tools, a top center hitch and a pair of spaced lower hitches. Prior art devices fail to provide a log skidding device which operates using a three point hitch with a log skidder that operates by controls in the tractor so that the user does not have to dismount the tractor to lift, move, and release a log.

U.S. Pat. No. 2,520,722, issued Aug. 29, 1950 to Irrer, provides a log grapple for removable support upon the rear of a tractor having a tool lift mechanism. The log grapple can be operated solely by the tractor driver, to lift one end of the log to be moved, skid the load to another location and then utilize a handle attached to the pickup tongs, which enables the tractor operator to release the log in the new location.

U.S. Pat. No. 2,566,616, issued Sep. 4, 1951 to Larson, shows a logging apparatus for a tractor having a lift apparatus which comprises a semi-circular frame, a U-shaped swivel yoke attached to the frame, a swivel attached to the swivel yoke and a pair of logging tongs suspended from the swivel.

U.S. Pat. No. 5,061,150, issued Oct. 29, 1991 to Rentschler, claims an apparatus for single-handed operation in skidding logs, stumps, poles and the like, wherein an A-frame with rearwardly-extending beam is attached to the three-point hitch of a tractor. A fluid-operated grapple, which will inherently adjust to various shapes and sizes of objects, is suspended from the rearward end of the beam. A chain, having a small amount of slack, is connected by its ends to the grapple tongs, and is rove around sleeved bolts near the draft arm attachment points. When the object to be skidded is grappled and lifted, the operator moves the tractor in the desired direction, and the chain immediately takes the towing load.

U.S. Pat. No. 5,405,238, issued Apr. 11, 1995 to Samsel, Jr., describes a three point log skidder which provides a grapple tongs device for mounting to the three-point hitch of the type found on agricultural tractors. The apparatus of this invention comprises a three-point hitch mounting, a grapple boom extending from the hitch mounting, a grapple tongs device suspended from the outer end of the grapple boom, and means for orienting the grapple tongs. The means for orienting the grapple tongs preferably also is employed to open the grapple tongs, the tongs preferably being of the gravity-closing type.

U.S. Pat. No. 5,564,887, issued Oct. 15, 1996 to Brooks, discloses a log skidder apparatus which includes a frame provided with pivotal attachment points for the reception of the three point hitch components of a tractor. One of the frame carried attachment points is coupled to a hydraulic cylinder for imparting tilting movement to the frame to lift and advance the end of a log being transported into abutment with the frame. A truss of the frame carries a grapple assembly. An upright shaft is journalled in the truss and carries the grapple assembly with the shaft having an arm thereon biased by a spring urging the assembly to a predetermined position to facilitate grapple engagement with a log end. The frame is equipped with plates to confine the log end against displacement from the frame.

U.S. Pat. No. 6,921,241, issued Jul. 26, 2005 to Rogers, indicates a multi-purpose log-handling tool for attachment to the three-point hitch of a tractor or other vehicle. The log-handling tool includes a boom and an inverted U-shaped frame containing a number of apertures to which accessory tools may be attached. The boom and the frame are connected to the tractor and at one of the apertures to permit the outer end of the boom to be lowered and raised by an operator controlling one or more hydraulic pistons. The apertures are preferably longitudinally arranged along a flange affixed to the bottom of the boom. Multiple apertures permit the simultaneous use of more than one tool, which might include logging tongs, chains, or winches. A flexible assembly for coupling the boom to the hydraulic piston accommodates for skewing action as a log is dragged and thereby reduces potential for damage to the log-handling tool.

What is needed as a log skidding device which operates using a three point hitch with a log skidder that operates by controls in the tractor so that the user does not have to dismount the tractor to lift, move, and release a log.

BRIEF SUMMARY OF THE INVENTION

An object of the present invention is to provide a log skidding device which uses a three point hitch with a log skidder that operates by controls in the tractor so that the user does not have to dismount the tractor to lift, move, and release a log.

In brief, the present invention provides a log skidding implement for a three point tractor hitch. It consists of a frame that attaches to the lift arms and top link of a tractor hitch, a horizontal boom four feet long, and a set of modified skidding tongs hanging vertically from the end of the boom. The present invention is preferably fabricated of welded steel using heavy duty materials in a design built for optimum strength.

The implement is simple to use. The user will fell a tree and trim any branches. Then the user will back the tractor up to an end of the log such that the tongs are centered over the tree and they are approximately 12 inches from the end. The boom is lowered causing the tongs to spread and straddle the log via a scissors action. Once the pointed ends of the tongs have gone below the halfway point of the logs diameter, the user lifts the boom. The tong's points pierce the log gripping it tightly, and the log end is lifted off the ground to a height of 6-8 inches. The log is then pulled to its destination. At the destination, the boom is lowered completely until the tongs disengage themselves from the log. Then the driver pulls forward allowing the tongs to slide off of the end of the log. Once the tongs are clear of the log, the driver would raise the boom.

This device allows one to skid logs without leaving the tractor seat. No more will they have to get down off the tractor to hook and unhook chains from around the log ends. This is safer and faster and takes less effort.

An advantage of the present invention is that it allows a user to skid logs without leaving the tractor seat.

Another advantage of the present invention is that it safer than prior devices.

One more advantage of the present invention that it is easier to use and faster than prior devices.

Yet another advantage of the present invention is that it eliminates the need for manually attaching the log to the skidding device.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings:

FIG. 1 is a perspective view of the automatic log skidding device of the present invention;

FIG. 2 is a perspective view of the pair of tongs and top pivot arms of the present invention of FIG. 1;

DETAILED DESCRIPTION OF THE INVENTION

Figure 3:
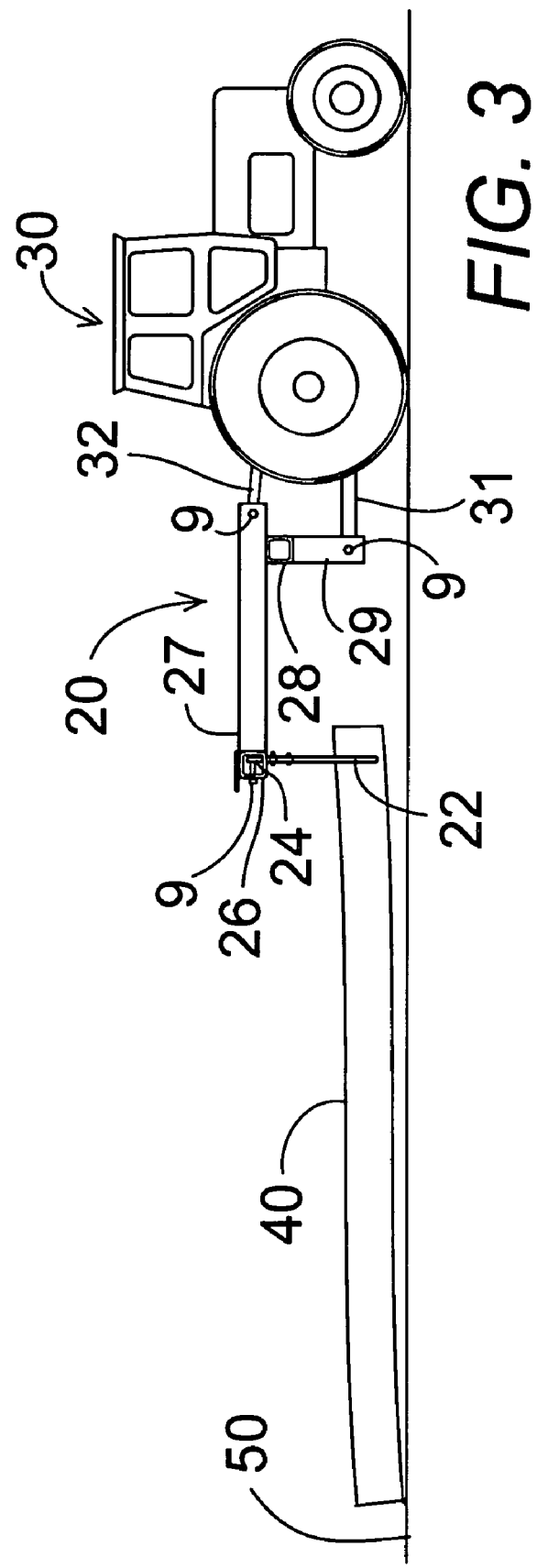
FIG. 3 is a side elevational view of the present invention of FIG. 1 mounted on a three point hitch of a tractor shown dragging a log.

In FIGS. 1-3, a log skidding device 20 for a three point tractor hitch uses a pair of tongs 22 which automatically grip the log 40 when lowered onto the log and lifted and automatically release the log when lowered and moved horizontally away from the log.

An attaching frame comprises two spaced parallel rigid vertical members 29 and a top rigid horizontal connecting member 28 attached to the top of each of the vertical members to interconnect the two vertical members. Each of the vertical members 29 has a horizontal bottom opening 19 to admit a pivot shaft 9, which may be a bolt and nut assembly, for connecting to a pair of lift arms 31 on a three point tractor hitch of a tractor through a bottom back access space 15, as shown in FIGS. 1 and 3.

A horizontal boom 27 is rigidly secured to a center of the horizontal member 29 of the attaching frame so that the horizontal boom extends away from the attaching frame. The horizontal boom comprises a rigid elongated horizontal beam having a horizontal opening 19 therethrough at a proximal end to admit a pivot shaft 9, which may be a bolt and nut assembly, for connecting a top link 32 of a three point tractor hitch of the tractor 30, and a beam cross arm 26 attached to the distal end of the of the horizontal boom 27. The beam cross arm 26 has a bottom opening 16 to admit a pair of top pivot arms 24. The top pivot arms are attached to the beam cross arm 26 by a pivot shaft 9, which may be a bolt and nut assembly, through openings in the back and front of the beam cross arm aligned with the longitudinal axis of the horizontal beam 27.

A log lifting element comprises a pair of tongs 22, each tong comprising an outwardly bowed arm with an inwardly facing point 21 on a bottom end. The pair of tongs is interconnected by a scissor pivot pin 23 at a point spaced apart from a top end of the tongs so that a top portion of the tong extends above the scissor pin. The top portion 22A of each of the tongs 22 is interconnected by a connecting pivot pin 23A to a bottom end of one of the top pivot arms 24 so that lowering the log lifting element down over a log automatically opens the pair of tongs 22 due to the multiple pivot connections and after the points of the pair of tongs have been lowered over halfway down the width of the log 40, lifting the pair of tongs causes the tongs to close on the log with the points sticking into the log. The bowed portion of the pair of tongs 22 assists in lifting the log so that one end of the log 40 is elevated above the ground 50 and so that moving the tractor 30 forward causes the pair of tongs to drag the log along the ground. Once the pair of tongs 22 is lowered sufficiently so that the end of the log 40 contacts the ground at a new location, lowering the pair of tongs further causes the pair of tongs to release the log, whereupon driving the tractor forward pulls the pair of tongs away from the log.

In a preferred embodiment, the attaching frame and horizontal boom are fabricated of steel channels welded together.

In use, the device of the present invention is attached to a three point hitch on a tractor. A user backs the tractor up to an end of the log such that the tongs are centered over the log approximately 12 inches from the end. Using controls inside the tractor, the user lowers the horizontal boom causing the tongs to spread and straddle the log in a scissors action. Once the pointed ends of the tongs have gone past the halfway point of the log's diameter, the user lifts the boom, using controls inside the tractor causing the tongs' points to pierce the log, gripping it tightly, lifting the end of the log off the ground. The user maintains a height of 6 to 8 inches off the ground for the end of the log that is pierced by the tongs. The user drives the tractor, pulling the log behind it, to the log's destination. At the destination, the user lowers the boom completely until the tongs disengage themselves from the log. Then the driver pulls the tractor forward, allowing the tongs to slide off the end of the log. Once the tongs are clear of the log, the user raises the boom.

It is understood that the preceding description is given merely by way of illustration and not in limitation of the invention and that various modifications may be made thereto without departing from the spirit of the invention as claimed.

What is claimed is:

1. A log skidding device for a three point tractor hitch, the device comprising:

an attaching frame comprising two spaced parallel rigid vertical members and a top rigid horizontal connecting member attached to the top of each of the vertical members to interconnect the two vertical members, each of the vertical members having a horizontal bottom opening therethrough to admit a pin for connecting to a pair of lift arms on a three point tractor hitch of a tractor;

a horizontal boom rigidly secured to a center of the connecting member so that the horizontal boom extends away from the attaching frame, the horizontal boom comprising a rigid elongated horizontal beam having a horizontal opening therethrough at a proximal end for connecting a top link of a three point tractor hitch of the tractor and a horizontal attaching pivot pin aligned with the longitudinal axis of the horizontal beam at a distal end, a pair of top pivot arms each attached at a top end to the attaching pivot pin;

a log lifting element comprising a pair of tongs each tong comprising an outwardly bowed arm with an inwardly facing point on a bottom end, the pair of tongs interconnected by a scissor pivot pin at a point spaced apart from a top end so that a top portion of the tong extends above the scissor pin, and each top portion of the tong interconnected by a connecting pivot pin to a bottom end of one of the top pivot arms so that lowering the log lifting element down over a log automatically opens the pair of tongs due to the multiple pivot connections and after the points of the pair of tongs have been lowered over halfway down the width of the log, lifting the pair of tongs causes the tongs to close on the log with the points sticking into the log and the bowed portion of the pair of tongs assists in lifting the log so that one end of the log is elevated above the ground and so that moving the tractor forward causes the pair of tongs to drag the log along the ground, and upon lowering the pair of tongs so that the end of the log contacts the ground at a new location and further lowering the pair of tongs causes the pair of tongs to release the log and driving the tractor forward pulls the pair of tongs away from the log.

2. The device of claim 1 wherein the attaching frame and horizontal boom are fabricated of steel channels welded together.

\* \* \* \* \*